United States Patent
Kondratowicz et al.

(10) Patent No.: US 11,993,691 B2
(45) Date of Patent: May 28, 2024

(54) USE OF GEOPOLYMERIC ADDITIVE IN COMBINATION WITH NON-BROMINATED FLAME RETARDANT IN POLYMER FOAMS

(71) Applicant: SYNTHOS S.A., Oswiecim (PL)

(72) Inventors: Filip Lukasz Kondratowicz, Cracow (PL); Kamil Utrata, Cwiklice (PL)

(73) Assignee: SYNTHOS S.A., Oswiecim (PL)

( * ) Notice: Subject to any disclaimer, the term of this patent is extended or adjusted under 35 U.S.C. 154(b) by 0 days.

(21) Appl. No.: 17/877,183

(22) Filed: Jul. 29, 2022

(65) Prior Publication Data
US 2023/0052386 A1 Feb. 16, 2023

Related U.S. Application Data

(63) Continuation of application No. 16/319,182, filed as application No. PCT/EP2017/068390 on Jul. 20, 2017, now abandoned.

(30) Foreign Application Priority Data

Jul. 20, 2016 (EP) .................................. 16461541

(51) Int. Cl.
C04B 28/00 (2006.01)
C08J 9/00 (2006.01)
(Continued)

(52) U.S. Cl.
CPC ............... *C08J 9/18* (2013.01); *C04B 28/006* (2013.01); *C08J 9/0038* (2013.01); *C08J 9/0066* (2013.01);
(Continued)

(58) Field of Classification Search
CPC ...... C08J 9/0028; C08J 9/0038; C08J 9/0066; C08J 9/0095; C08J 9/04; C08J 9/141;
(Continued)

(56) References Cited

U.S. PATENT DOCUMENTS

| 4,798,749 A | 1/1989 | Arch et al. |
| 4,827,005 A | 5/1989 | Hilterhaus |

(Continued)

FOREIGN PATENT DOCUMENTS

| CN | 101068863 A | 11/2007 |
| CN | 102430419 | 5/2012 |

(Continued)

OTHER PUBLICATIONS

Falah et al., "New composites of nanoparticle Cu(I) oxide and titania in a novel inorganic polymer (geopolymer) matrix for destruction of dyes and hazardous organic pollutants" Journal of Hazardous Materials, vol. 318: 772-782 (2016).
(Continued)

*Primary Examiner* — Irina S Zemel
*Assistant Examiner* — Jeffrey S Lenihan
(74) *Attorney, Agent, or Firm* — NIXON & VANDERHYE, PC (57) ABSTRACT

The invention relates to the use of i) geopolymer and ii) non-brominated, phosphorus- and/or nitrogen-based flame retardants for improving the self-extinguishing properties of a composition comprising polymer. The polymer may be a vinyl aromatic polymer, and may be in a granulate or foam.

22 Claims, 1 Drawing Sheet

Average particle size distribution of the geopolymer composite obtained in Example 1.

(51) Int. Cl.
*C08J 9/14* (2006.01)
*C08J 9/16* (2006.01)
*C08J 9/18* (2006.01)
*C08J 9/228* (2006.01)
*C08K 3/32* (2006.01)
*C08K 3/34* (2006.01)
*C08K 5/5397* (2006.01)
*C04B 103/63* (2006.01)
*C04B 111/28* (2006.01)

(52) U.S. Cl.
CPC .............. *C08J 9/0095* (2013.01); *C08J 9/141* (2013.01); *C08J 9/16* (2013.01); *C08J 9/228* (2013.01); *C08K 3/32* (2013.01); *C08K 3/34* (2013.01); *C08K 5/5397* (2013.01); *C04B 2103/63* (2013.01); *C04B 2111/28* (2013.01); *C08J 2201/03* (2013.01); *C08J 2203/14* (2013.01); *C08J 2203/182* (2013.01); *C08J 2203/22* (2013.01); *C08J 2325/04* (2013.01); *C08J 2325/06* (2013.01); *C08J 2325/08* (2013.01); *C08K 2003/323* (2013.01); *C08K 2003/329* (2013.01); *C08K 2201/005* (2013.01); *C08K 2201/006* (2013.01); *Y02P 40/10* (2015.11)

(58) Field of Classification Search
CPC ...... C08J 9/16; C08J 9/18; C08J 9/228; C08L 25/00; C08L 25/04; C08L 25/06; C08L 25/08; C08L 5/16; C08L 2666/36; C08L 2666/40; C08L 2666/54; C08L 2201/02; C08L 2203/14
See application file for complete search history.

(56) References Cited

U.S. PATENT DOCUMENTS

| | | | |
|---|---|---|---|
| 4,871,829 | A | 10/1989 | Hilterhaus |
| 7,771,686 | B2 | 8/2010 | Sagoe-crentsil et al. |
| 11,440,843 | B2 * | 9/2022 | Kondratowicz ...... C04B 28/005 |
| 2004/0227130 | A1 | 11/2004 | Hoerold et al. |
| 2007/0112082 | A1 | 5/2007 | Hahn et al. |
| 2008/0028994 | A1 | 2/2008 | Barlet-Gouedard et al. |
| 2008/0249199 | A1 | 10/2008 | Nising |
| 2010/0304165 | A1 | 12/2010 | Han et al. |
| 2012/0184635 | A1 * | 7/2012 | Eberstaller ............. C08J 9/0066 521/85 |
| 2012/0264836 | A1 | 10/2012 | Felisari et al. |
| 2013/0284069 | A1 | 10/2013 | Dubey |
| 2014/0342156 | A1 | 11/2014 | Seo |
| 2016/0194247 | A1 | 7/2016 | Dubey |
| 2019/0241472 | A1 | 8/2019 | Kondratowicz et al. |
| 2019/0276360 | A1 | 9/2019 | Kondratowicz et al. |

FOREIGN PATENT DOCUMENTS

| | | |
|---|---|---|
| CN | 102597091 | 7/2012 |
| CN | 102604291 A | 7/2012 |
| CN | 102741191 | 10/2012 |
| CN | 103449794 | 12/2013 |
| CN | 103946181 | 7/2014 |
| CN | 104803619 | 7/2015 |
| CN | 105462164 | 4/2016 |
| EP | 0863175 | 9/1998 |
| EP | 0981574 | 3/2000 |
| EP | 1148088 | 10/2001 |
| EP | 1693413 | 8/2006 |
| EP | 1758951 | 3/2007 |
| EP | 1771502 | 4/2007 |
| EP | 1997849 | 12/2008 |
| FR | 3019176 | 10/2015 |
| JP | 3018341 | 3/2000 |
| KR | 20110065707 | 6/2011 |
| KR | 101431002 | 9/2014 |
| WO | 9831644 | 7/1998 |
| WO | 9851735 | 11/1998 |
| WO | 2006007995 | 1/2006 |
| WO | 2008141767 | 11/2008 |
| WO | 2012146577 | 11/2012 |
| WO | 2013044016 | 3/2013 |
| WO | 2016113321 | 7/2016 |
| WO | WO2016113321 A1 * | 7/2016 |
| WO | 2018015490 | 1/2018 |

OTHER PUBLICATIONS

Sazama et al. "Geopolymer based catalysts—New group of catalytic materials" Catalysis Today, vol. 164: 92-99 (2011).
Extended European Search Report issued in 16461540.3 dated Feb. 15, 2017.
International Search Report issued in PCT/EP2017/068371 dated Nov. 7, 2017.
Office Action issued in EP Appln. No. 17743315.8 dated Aug. 5, 2020.
Examination Report issued in CN App No. 201780044464.4 (dated Jan. 28, 2021).
Glad et al., "Geopolymer with Hyrdogel Characteristics via Silane Coupling Agent Additives", J. Am. Ceram. Soc., 97 [1] 295-302 (2014) (Year: 2014).
International Search Report issued in PCT/EP2017/068346 dated Oct. 19, 2017.
Hajimohammadi et al., "One-Part Geopolymer Mixes from Geothermal Silica and Sodium Alumiate", Ind. Eng. Chem. Res., vol. 47: 9396-9405 (2008).
Chinese Examination Report and English Translation issued for corresponding Chinese Application No. 201780044464.4 dated Apr. 28, 2022 (11 pages).
International Search Report issued in PCT/EP2017/068390 dated Nov. 7, 2017.
De Weerdt et al., "Geopolimers—State of the art", SINTEF Building and Infrastructure, COIN Project report 37-2011, 39 pages.
Declaration of Dr. Filip Kondratowicz Re: Opposition against European patent EP 3475241 (EP17749143.8), Annex A-F, Jul. 14, 2022, 52 pages.
Duxon et al., "Geopolymer technology: the current state of the art", Journal of Materials Science (2007), 42(9) 2917-2933, 17 pages.
Skvara, "Alkali Activated Materials Or Geopolymers?", Ceramics Silikaty, Submitted Jan. 17, 2007, 5 pages.
McNaught et al., "IUPAC. Compendium of Chemical Terminology,", http://iupac.org, 2005-2019 International Union of Pure and Applied Chemistry, 2nd ed. the Gold Book, 1 page.
Expert Declaration by Mr. Riccardo Felisari dated Feb. 11, 2021, titled: "Scanning electron microscopy (SEM) with energy dispersive X-ray spectrometry (EDS) of geopolymer composite", (SEM, Eds), 5 pages.
Expert Declaration by Mr. Riccardo Felisari dated Feb. 11, 2021, titled: "Flame retardancy and thermal conductivity of EPS sheets containing non-brominated flame retardants and geopolymer composite comprising coke", with Annex A, 178 pages.
Declaration of Prof. Miguel Angel Rodriguez-Perez dated Jul. 2021, 2 pages.
Campo-Arnaíz et al., "Extinction Coefficient of Polyolefin Foams", Journal of Polymer Science, Jan. 30, 2002, 10 pages.
Declaration of Dr. Filip Kondratowicz Re: Opposition against European patent EP 3 475 241 (17749143.8), Annex A-B, Jul. 13, 2021, 8 pages.
Declaration of Dr. Filip Kondratowicz, Annex A-B, Jul. 13, 2021, 52 pages.
Felisari Experimental report, "Sedimentation experiment of geopolymer composite comprising coke in styrene", Dec. 21, 2020, 9 pages.
Felisari Experimental report, "Analysis of thermal conductivity model of D18 (WO 2008141767) and Syn1thos submissions D22", Jul. 13, 2021, 9 pages.
Domínguez-Muñoz et al., "Uncertainty in the Thermal Conductivity of Insulation Materials", Building Simulation, Eleventh International IBPSA Conference. Jul. 27-30, 2009, 6 pages.

(56) References Cited

OTHER PUBLICATIONS

Castiglioni et al., "Foam morphology and thermal conductivity in EPS foams", Eni Versalis Research Centre, Jul. 2016, 2 pages.
Dombrovsky et al., "Some physical models used to identify and analyze infrared radiative properties of semi-transparent dispersed materials", Journal of Spectroscopy and Dynamics, 2011, 20 pages.
Declaration of Dr. Filip Kondratowicz, Annex 1-2, Feb. 26, 2021, 37 pages.
Patentee's Response to Opponent's Grounds of Appeal dated Jan. 17, 2022 regarding EP3245172, 94 pages.

* cited by examiner

Average particle size distribution of the geopolymer composite obtained in Example 1.

USE OF GEOPOLYMERIC ADDITIVE IN COMBINATION WITH NON-BROMINATED FLAME RETARDANT IN POLYMER FOAMS

This application is a continuation of U.S. application Ser. No. 16/319,182, filed Jan. 18, 2019, which is the U.S. national phase of International Application No. PCT/EP2017/068390 filed Jul. 20, 2017 which designated the U.S. and claims priority to EP 16461541.1 filed Jul. 20, 2016, the entire contents of each of which are hereby incorporated by reference.

The present invention relates to the use of i) geopolymer and ii) non-brominated, phosphorus- and/or nitrogen-based flame retardants selected for improving the self-extinguishing properties of a composition comprising polymer. Further, the invention relates to a process for the production of expandable polymer granulate by an extrusion or a suspension process, preferably wherein the polymer is a vinyl aromatic polymer. Moreover, the invention relates to a composition comprising polymer, the composition further comprising i) geopolymer and ii) non-brominated, phosphorus- and/or nitrogen-based flame retardants.

Vinyl aromatic polymers are known and are used for the preparation of expanded products that are adopted in a variety of applications, of which the most important one is for thermal insulation. This is why there is a continuously increasing demand for expanded vinyl aromatic polymers with low thermal conductivity as well as good mechanical and self-extinguishing properties.

Hexabromocyclododecane (HBCD) has been used as a flame retardant in vinyl aromatic polymer foams for many years. Only very small quantities of HBCD are needed to meet the self-extinguishing standards. In vinyl aromatic polymer foams, such as expandable polystyrene, the required final concentration is in a range of from 0.5 to 1.0 wt. %. However, HBCD was recognized as Substance of Very High Concern and was placed by the European Chemical Agency onto the SVHC list (decision of 28 Oct. 2008). Also, HBCD has been found widely present in biological samples from remote areas, and there is supporting evidence for its classification as persistent, bioaccumulative and toxic (PBT) and that it undergoes long-range environmental transportation. Due to its persistence, toxicity, and ecotoxicity, the Stockholm Convention on Persistent Organic Pollutants (POPs) decided in May 2013 to include HBCD in the Convention's Annex A for elimination, with specific exemptions for expanded and extruded polystyrene in buildings, which was needed to give countries time to phase-in safer substitutes.

In the meantime, a much more environmentally sustainable alternative to HBCD has been implemented by polystyrene foam producers, namely a brominated polybutadiene block copolymer (polymeric brominated flame retardant, pFR) which is now available on the market. Compared to HBCD, pFR exhibits a more sustainable health, safety and environmental profile. High molecular weight polymeric additives have inherently better environmental and health risk profiles and often provide a more sustainable solution than smaller molecules. Nevertheless, bromine is present during the production and in the final use of the pFR. Also, bromine production and bromination processes themselves are recognized as very pollutant for the environment and toxic for humans. Moreover, even though bromine as incorporated into the polymeric foam as pFR is not eluted, it can be found in the environment after tens or hundreds of years, due to degradation of the polymer matrix if exposed to the degenerative activity of the sun's UV radiation, humidity, air, and water. The same problem is associated with other polymeric materials which are self-extinguished by brominated macro- or simple molecules and are exposed to the environment. Finally, halogenated FRs, in particular brominated FRs, have limited thermal stability, which puts constraints on the processing of the compositions to which they are added.

Elimination of brominated flame retardants for use in polymers in general is the only sustainable way to produce more environmentally and human-friendly products which are not persistent, bioaccumulative and toxic. One of the solutions is the use of earth minerals in combination with phosphorus- and/or nitrogen-based flame retardants, but their efficiency in flame suppressing is very low and a high loading is necessary to achieve the desired flame retardancy. Such synergistic compositions are widely known from the car or cable industries.

Due to the efforts to reduce the loading of e.g. polystyrene foams with brominated flame retardant, and thus efforts to prevent the production of toxic gases and a high level of smoke during combustion, the attention focuses on non-halogenated flame retardants. A variety of phosphorus-containing compounds is used and maintains a high level of fire safety.

The function mechanism of phosphorus flame retardants varies, depending on the type of chemical structure of the phosphorus compound and its interaction with the polymer or the other additives during pyrolysis. Also, the flame retarding action may be optimized using a synergistic compound. The interaction may take place according to both physical and chemical mechanisms and may occur in the condensed or in the vapour phase. Often, two or more different mechanisms are involved in given systems.

In the condensed phase, the phosphorous-containing additives catalyse the clipping of polymer chains, thereby reducing polymer molecular weight and resulting in a decrease of viscosity, causing consequently heat loss due to dripping. Furthermore, phosphorus acts due to acid-catalyzed dehydration and char formation, providing thermal insulation for underlying polymer and preventing fuel release. The phosphorous-rich flame retardants cause an initial crosslinking reaction through the polymer, and this means that the polymer is prevented from volatilising (thus, less combustible species are formed). Another mode action is via intumescence (swelling). In the gas phase, phosphorus compounds cause radical recombination as well as replacement of hydrogen and hydroxyl radicals by other, less effective radicals, thus inhibiting combustion. Examples of commercially available phosphorus- and nitrogen-containing flame retardants are ammonium polyphosphates (e.g. Exolit 462), melamine phosphates (e.g. Melpur 200), triphenylphosphate (e.g. Disflammol TP), bisphenol A bis-(biphenylphosphate) (e.g. Fyroflex BDP), and 9,10-Dihydro-9-oxa-10-phospha-phenanthrene 10-oxide (e.g. STRUKTUROL).

Nitrogen compounds are characterised by low toxicity and relatively low release of smoke during fire, as well as a high decomposition temperature, which is an advantages for thermoplastic polymers that are processed via extrusion or injection moulding.

The interaction mechanism is usually physical, although a chemical mode of action is also known. Nitrogenous agents like melamine cyanurate or melamine undergo sublimation at ca. 350° C., whereby a significant amount of thermal energy is absorbed. Degradation of cyanuric acid also costs energy which consequently leads to decrease of the temperature in the fire zone. At higher temperature, the decomposition of melamine results in the elimination of ammonia and the formation of inert gases. Oxygen or other combustible gases dilute in inert gases, which consequently results in the formation of thermally stable condensates. Melamine as well as it salts promote dripping, resulting in the withdrawal of fuel. Melamine compounds are usually used together with other flame retardants offering synergistic effects, and such an effect with phosphorus based formulations is well known. Melamine, melamine cyanurate and other melamine salts and compounds are currently the most used group of nitrogen-containing flame retardants.

Unfortunately, a high concentration of mineral or phosphorus- or nitrogen-based flame retardant very much deteriorates the general properties of polymer foams. This is why brominated FR's have been used for decades in vinyl aromatic polymer foams. Their high effectivity in the gas phase, thus relatively low concentrations (up to 3 wt. %), gives an enormous advantage in the self-extinguishing of vinyl aromatic polymeric foams. Up to know no better solution has been found.

EP 1 997 849 A1 teaches inorganic materials as binder coating on expandable or expanded polystyrene beads or particles. The disadvantage of coated beads is that foam having a with very high density (of above 70 kg/m³) is formed, because the coating has to be with a high loading, such as 80% by weight or more. Such foams also suffer from a high water adsorption, and only interior applications are possible. Moreover, foams prepared from coated beads have a high stiffness, which results in problems during cutting. Because the coating is applied onto beads, so one needs specific mixers and special moulds. Consequently, this technology is not applicable for current customers equipment, and results in foams having limited applications.

WO2008/113609 A2 discloses geopolymer compositions and coatings prepared therefrom.

Furthermore, WO 2016/113321 A1 teaches that the addition of geopolymer or its composite as prepared with various types of athermanous additives makes it possible to maintain the polymer foam's self-extinguishing and mechanical properties in the same range as in an expanded polymer without addition of filler or any other athermanous additive, while at the same time the thermal conductivity can be decreased significantly. This is possible because the geopolymer itself gives fire resistance, and further encapsulates the particles of athermanous additive, especially of those additives that are based on carbon or mineral, and separates them from any disadvantageous interactions with the flame, the polymer, or the flame retardant. The presence of geopolymer further decreases thermal conductivity, because of its own heat radiation scattering effect.

Geopolymers are inorganic amorphous polymers with a three-dimensional, crosslinked alumina silicate structure, consisting of Si—O—Al—O bonds. The structure may be created in a sol-gel method by metal alkali activation of alumina silicate precursors. The formed gel product contains alkaline cations which compensate for the deficit charges associated with the aluminium-for-silicon substitution. During the dissolution of alumina silicate precursor and gel formation, an intermediate, aluminium rich phase is first formed which then gives way to a more stable, silicon-rich product. Under these conditions, free $SiO_4$ and $AlO_4^-$ tetrahedral units are generated and are linked to yield polymeric precursors by sharing all oxygen atoms between two tetrahedral units, while water molecules are released. The tetrahedral units are balanced by group I or II cations ($Na^+$, $K^+$, $Li^+$, $Ca^{2+}$, $Ba^{2+}$, $NH_4^+$, $H_3O^+$, which are present in the framework cavities and balance the negative charge of $Al^{3+}$ in tetrahedral coordination, i.e. $AlO_4^-$). This material was early investigated and developed by Davidovits after various catastrophic fire incidents in France in the 1970s. The term "geopolymer" was coined in view of the transformation of mineral polymers from amorphous to crystalline reaction through a geochemical process at low temperature and short curing time. Geopolymers are represented by the general chemical formula of $M_n[-(Si-O_2)_z-Al-O]_n \cdot w\ H_2O$, in which M is an alkali metal, z is 1, 2 or 3 and n is the degree of polymerization. Based on the Si/Al molar ratio, three monomeric units can be defined: polysialate (Si/Al=1; Si—O—Al—O—), polysialatesiloxo (Si/Al=2; Si—O—Al—O—Si—O—) and polysialatedisiloxo (Si/Al=3; Si—O—Al—O—Si—O—Si—O—.

The structure of geopolymers can be amorphous or semi crystalline, depending on the condensation temperature. Amorphous polymers are obtained at 20-90° C., whereas semi-crystalline polymers are obtained in the range 150-1200° C. This class of materials demonstrates ceramic-like properties, including extreme fire resistance. Geopolymers can be amorphous or crystalline materials. They possess a microstructure on a nanometre scale (as observed by TEM and measured by mercury porosimetry) which comprises small aluminosilicate clusters with pores dispersed within a highly porous network. The cluster size is typically between 5 and 10 nm. The synthesis of geopolymers from aluminosilicate materials takes place by the so-called geopolymerization process, which involves polycondensation phenomena of aluminate and silicate groups, with formation of Si—O—Al type bonds. WO2015/191817 A1 teaches geopolymer aggregates and their use in a variety of applications.

US 2008/0 249 199 A1 teaches a method for the manufacture of foamed or foamable particles from a polymer melt. A recycled polymer melt is introduced into the polymer melt through a side extruder and may include additive. This is said to be more economical than the use of a masterbatch. If bromide-containing flame protection agents or other thermally unstable additives are present in the recycled polymer, or are added to the recycled polymer, the process temperature in the side extruder and in all following system components should not exceed a temperature and dwell time limiting value which is defined by the thermal stability of the additives.

WO 2006/058733 A1 teaches expandable styrene polymer granulates containing a) athermanous additive selected from the group of inorganic powder materials such as silicic acid and b) carbon black or graphite. Further, EP 0 863 175, EP 0 981 574, EP 1 758 951 and EP 1 771 502 A2 teach the use of graphite in polystyrene foam obtained by an extrusion process.

WO 2006/058733 also teaches that the mechanical properties of thermoplastic polymers containing fillers can be improved by using adhesion promoters (coupling agents), such as maleic anhydride modified styrene copolymers, epoxy group containing polymers, organosilanes or styrene copolymers having isocyanate or acid group. Similar to US 2008/0 249 199 A1, WO 2006/058733 A1 also proposes to use side extruders for introducing additives such as solids and thermally sensitive additives. This arrangement is, however, undesirable in situations where additives that are not thermally sensitive, but rather require thorough mixing, are to be introduced. This is because large amounts of material would need to be processed if additives that require thorough mixing were to be introduced into a main portion of the polymer. This is economically undesirable. The addition of dedicated coupling agents is likewise undesirable, especially if they need to be used in large amounts.

WO 2004/087798 A1 teaches expandable vinyl aromatic polymers comprising, in a polymer matrix, a type of carbon black having an active surface area ranging from 5 to 40 m$^2$/g. The thermal conductivity of a material with a density of 14 g/l is reported to be 36.5 mW/m*K.

WO 2006/061571 A1 teaches an expandable polystyrene composition comprising carbon black as an additive, the carbon black having a very high BET surface, as measured according to ASTM D 6556, ranging from 550 to 1,600 m$^2$/g. The examples report polystyrene foam with a thermal conductivity of 36.16 mW/m*K at density 13.3 g/l according to ASTM D 1622, and 34.21 mW/m*K at density 19.4 g/l, respectively.

WO 2008/061678 A2 discloses the use of carbon black having a specific electric conductivity, to reduce the thermal conductivity of expandable vinyl aromatic polymers. The carbon black is introduced during suspension polymerization, or during polymer extrusion. The examples report polystyrene foam having a thermal conductivity of 31.0 mW/m*K at a density of 17 g/l.

Japanese patent JP 63183941 teaches the use of aluminium pigment, titanium dioxide and graphite, having specific particle size and heat radiation reflectivity, to reduce the thermal conductivity of polystyrene foams. Examples 7 to 11 teach polystyrene foam produced by an extrusion process and having a thermal conductivity of 25 to 30 mW/m*K, where masterbatches were used as starting material.

WO 2005/123816 A1 teaches styrene polymer particle foam materials. WO 2004/087798 A1 teaches expandable polystyrenes containing carbon black. In a suspension polymerization process, the carbon black is present during the polymerization in aqueous suspension. Also disclosed is a continuous process for preparing expandable polystyrene in mass, wherein the polymer is fed together with carbon black into an extruder, and, subsequently, expanding agent and possible further additives are injected into the molten polymer before extrusion through a die.

WO2010/128369 A1 teaches thermoinsulating expanded articles comprising an expanded polymeric matrix, obtained by expansion and sintering of beads/granules of a vinyl aromatic (co)polymer, in whose interior a filler is homogeneously dispersed, which comprises at least one athermanous material selected from coke, graphite and carbon black and optionally an active inorganic additive within the wavelengths ranging from 100 to 20,000 cm$^{-1}$.

US2012/264836 A1 teaches nanocomposite compositions based on expandable thermoplastic polymers which comprise: a) a polymeric matrix, b) expanding agent englobed in the polymeric matrix; c) athermanous filler comprising nano-scaled graphene plates having specific dimensions.

US 2008/0028994 A1 entitles "Geopolymer Compositions and Application in Oilfield Industry" teaches a geopolymer composition formed from a suspension comprising an aluminosilicate source, a metal silicate, an alkali activator, and a carrier fluid. Lightweight particles and/or heavyweight materials may be added to control density of the composition. Barium sulphate or ilmenite are examples for heavy particles.

WO 2010/141 976 A1 entitles "Concrete Aggregate" discloses polymeric aggregates produced from fly ash combined with an activator. The aggregate is used in concrete, mortar, or road base. WO2009/009089 A1 discloses a process for treating fly ash to render it highly usable as a concrete additive.

Figure 1:
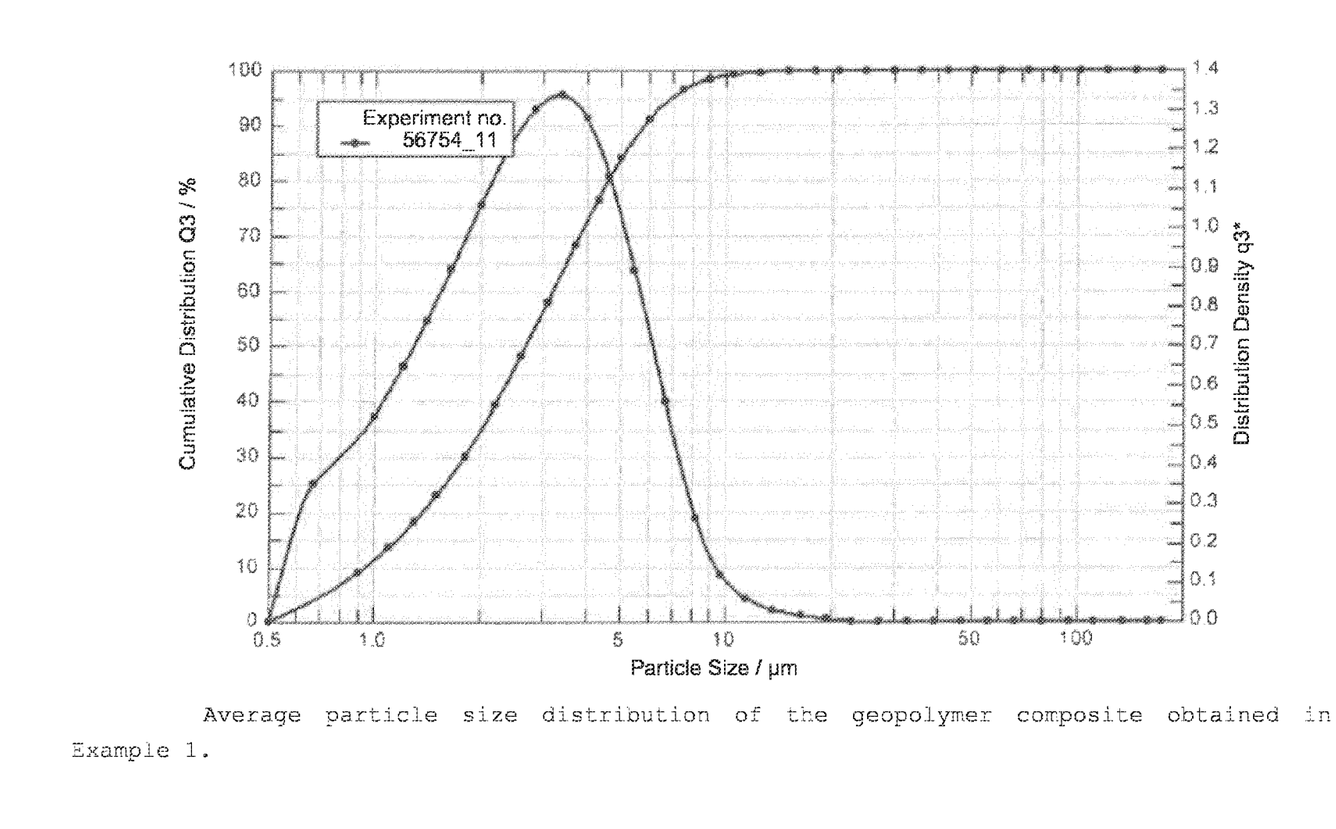
The FIGURE shows an average particle size distribution of the geopolymer composite obtained in Example 1.

It was the object of the present invention to provide improved flame retardants for polymers, for instance vinyl polymers, in particular vinyl aromatic polymers, especially when they are in the form of foams. These flame retardants should not necessarily comprise bromine, and should not deteriorate mechanical and other properties of the polymers to which they are added.

It has surprisingly been found that this object is solved in accordance with the present invention by the use of
i) one or more of
　a) a geopolymer;
　b) a combination of a geopolymer with an athermanous additive; and
　c) a geopolymer composite derived from geopolymer and comprising athermanous additive,
and
ii) one or more non-brominated flame retardants selected from
　a) phosphorus-based flame retardants,
　b) nitrogen-based flame retardants, and
　c) phosphorus/nitrogen-based flame retardants.

The addition of i) geopolymer, geopolymer in combination with athermanous additive, or geopolymer composite as prepared with various types of athermanous additives and ii) non-brominated phosphorus- and/or nitrogen-based flame retardants in relatively small concentrations in compositions comprising polymer makes it possible to maintain the composition's self-extinguishing properties, without the need for brominated flame retardants. Indeed, and if desired, the presence of brominated flame retardants can completely be dispensed with. This is possible because the geopolymer synergistically interacts with phosphorus- and/or nitrogen-based flame retardants.

According to the present invention, additives i) and ii) are incorporated into the polymer compositions as fillers. These additives can be used in typical compounding technology which is common for all thermoplastic polymers. This is in contrast to the teaching of EP 1 997 849 A1, where an inorganic material is used as a binder coating on expandable or expanded polystyrene beads or particles.

According to the present invention, the water content of the final (modified) geopolymer or (modified) geopolymer composite used/produced is preferably in a range of from 1 to 50 wt. %, preferably 2 to 30 wt. %, more preferably 3 to 20 wt. %.

(Modified) geopolymer or (modified) geopolymer composite used according to the present invention may be used together with brominated flame retardant. Because brominated flame retardants have limited compatibility with products having a certain sodium content, the sodium content of the (modified) geopolymer or (modified) geopolymer composite is preferably less than 5000 ppm, more preferably less than 500 ppm, in particular less than 200 ppm, such as less than 100 ppm, or even less than 50 ppm, each calculated on dry mass.

If the (modified) geopolymer or (modified) geopolymer composite used/produced according to the present invention is not used together with brominated flame retardant, then the sodium content need not necessarily be low. In this embodiment, the sodium content of the (modified) geopolymer or (modified) geopolymer composite is preferably less than 50,000 ppm, more preferably less than 10,000 ppm, in particular less than 5,000 ppm, each calculated on dry mass.

At the same time the thermal conductivity can be decreased. The presence of geopolymer decreases thermal conductivity, because of its own heat radiation scattering effect and influence on surface modification of carbon particles phase.

The present invention has the following aspects:

I) The use of i) one or more of a) a geopolymer; b) a combination of a geopolymer with an athermanous additive; and c) a geopolymer composite derived from geopolymer and comprising athermanous additive, and ii) one or more non-brominated flame retardants selected from a) phosphorus-based flame retardants, b) nitrogen-based flame retardants, and c) phosphorus/nitrogen-based flame retardants.

II) A process for the production of expandable polymer granulate by an extrusion or a suspension process, wherein the polymer is preferably a vinyl aromatic polymer.

III) A composition comprising one or more polymers, the composition further comprising a) a geopolymer; b) a combination of a geopolymer with an athermanous additive; and c) a geopolymer composite derived from geopolymer and comprising athermanous additive, and ii) one or more non-brominated flame retardants selected from a) phosphorus-based flame retardants, b) nitrogen-based flame retardants, and c) phosphorus/nitrogen-based flame retardants.

DETAILED DESCRIPTION

I) The Use of i) Geopolymer or Geopolymer Composite Derived from Geopolymer and Comprising Athermanous Additive, and ii) Non-Brominated Flame Retardants Selected from a) Phosphorus-Based Flame Retardants, b) Nitrogen-Based Flame Retardants, and c) Phosphorus/Nitrogen-Based Flame Retardants According to the first aspect, the present invention relates to the use of
i) one or more of
   a) a geopolymer;
   b) a combination of a geopolymer with an athermanous additive; and
   c) a geopolymer composite derived from geopolymer and comprising athermanous additive,
and
ii) one or more non-brominated flame retardants selected from
   a) phosphorus-based flame retardants,
   b) nitrogen-based flame retardants, and
   c) phosphorus/nitrogen-based flame retardants,
for improving the self-extinguishing properties of a composition comprising one or more polymers.

Preferably, the improvement is measured according to DIN 4102 (B1, B2) and EN ISO 11925-2, more preferably the improvement is measured according to EN ISO 11925-2.

Preferably, the polymer is selected from vinyl polymer, polyurethane, polyolefin, polycarbonate, polyester, polyamide, polyimide, silicone and polyether, more preferably the polymer is selected from vinyl aromatic polymer, polyethylene and polypropylene, most preferably the vinyl aromatic polymer is polystyrene.

Moreover, it is preferred that the composition does not comprise polymeric brominated flame retardant, more preferably the composition does not comprise brominated flame retardant. It is in particular preferred that the composition does not comprise halogenated flame retardant.

The athermanous additive as used in admixture with geopolymer, or as contained in geopolymer composite, is one or more selected from the group consisting of (1) carbon-based athermanous additives,
(2) metal athermanous additives,
(3) metal oxide athermanous additives, and
(4) metal sulfide athermanous additives.

Preferably, the carbon-based athermanous additive (1) is selected from carbon black, coke, graphitized carbon black, graphite, graphite oxides, anthracite, graphene, and graphene oxide.

The metal athermanous additive (2) is preferably selected from copper, bismuth, nickel, iron, tungsten, silver, cadmium, cobalt, tin, zinc.

The metal oxide athermanous additive (3) is preferably selected from oxides of the metals of groups IIIB, IV-VIIIA, and I-VB of the periodic table.

As will be explained below, the geopolymer or geopolymer composite may be modified with one or more water-soluble compounds. Preferably, the water-soluble compound is selected from phosphorus compounds, nitrogen compounds, copper compounds, silver compounds, zinc compounds, tin compounds, and magnesium compounds, more preferably the modification is with a phosphorus compound, in particular the modification is with a phosphorus compound selected from phosphoric acid and ammonium polyphosphate.

Geopolymer and Geopolymer Composite

The invention requires that geopolymer or geopolymer composite is used. Processes for the production of geopolymer are known, see e.g. WO2015/191817 A1.

In a first preferred embodiment, the geopolymer is present as geopolymer composite. It may be produced in accordance with the process of WO 2016/113321 A1, which process comprises
   a) mixing of an aluminosilicate component with an alkaline silicate solution, to form a gel,
   b) adding of an athermanous additive component to the gel, to form a filled gel,
   c) mixing of the filled gel, to form filled geopolymer,
   d) curing, drying and milling, to give filled geopolymer particles,
   e) optional removal of cations from the filled geopolymer particles, and
   f) obtaining the geopolymer composite.

In a second preferred embodiment for the geopolymer or geopolymer composite production process, the geopolymer or geopolymer composite is produced in accordance with the process of international patent application entitled "Process for the production of geopolymer or geopolymer composite" (PCT/EP2017/068346), filed on even date herewith, the disclosure of which application is incorporated herein in its entirety. PCT/EP2017/068346 claims priority from EP16461542.9 filed on Jul. 20, 2016.

According to this alternative process, geopolymer or geopolymer composite is prepared in a process comprising
   a) mixing of precursor for aluminate and silicate in alkaline solution, to form a sol-gel,
   b) optionally adding of one or more additives to the sol-gel, to form a filled sol-gel,
   c) adding water to the sol-gel or filled sol-gel, to form a diluted sol-gel or diluted filled sol-gel,
   d) mixing of the diluted sol-gel or diluted filled sol-gel, to form a geopolymer or geopolymer composite,
   e) obtaining a suspension of geopolymer or of geopolymer composite,
   f) optional reduction of the content of alkali metal cation within the structure of the geopolymer or geopolymer composite, and g) obtaining the geopolymer or geopolymer composite, wherein step e) comprises e1) decantation, or e2) adding of an organic phase, emulsifying, and stripping of the organic phase.

Step a) is preferably performed by mixing of precursor for aluminate and silicate, to form a sol-gel, wherein the mixing is under alkaline conditions.

This process will in the following be described further.

In the second preferred embodiment for the geopolymer or geopolymer composite production process, the mixing in step a) may comprise the mixing of an aluminosilicate, a phosphoaluminate, an alkaline silicate and/or an alkaline aluminate. Thus, in a first step, the sol-gel is prepared, for instance from a mixture of aluminosilicate precursor and activator such as sodium aluminate or sodium disilicate, with addition of water. It is also preferred to use sodium disilicate or sodium aluminate or their potassium analogues. Especially, it is preferred that the alkaline solution is a water-diluted sodium aluminate or sodium disilicate, in particular sodium aluminate.

Further, it has been found that the use of a geopolymer or a geopolymer composite prepared from a mixture of aluminosilicate precursor and phosphoaluminate further enhances the self-extinguishing effect in vinyl aromatic polymer foams. Also, this improvement is achieved when this type of athermanous and flame retarding constituent is used in other expandable vinyl polymers such as polyethylene and polypropylene or even other type of polymers such as polyamides, polyurethanes, polyesters, polyimides or various types of resins.

In a further preferred embodiment, the mixing in step a) involves one or more materials selected from the group consisting of dehydroxylated kaolinite, metakaolin, metakaolinite, fly ash, furnace slag, red mud, thermal silica, fumed silica, halloysite, mine tailings, pozzolan, kaolin, and building residues. Particularly preferred precursors are dehydroxylated kaolinite, metakaolin or metakaolinite, but also fly ash, furnace slag, red mud, thermal silica, fumed silica, halloysite and a mixture thereof.

After activation and dissolution, the ortho-sialate monomer [(HO)$_3$—Si—O—Al—(OH)$_3$] polycondensates and forms a sol-gel, so called "gel". The mixing is in a third step c) continued. Preferably, in step b), there is an addition of an additive, in micro or in nano powder form. During step a), b) or c), water can be introduced as a viscosity modification additive, and/or silane and/or latex as adhesion modifiers.

Changes in the Si/Al ratio can drastically affect the flexibility of obtained modified geopolymer. According to the present invention, the smaller the value of the Si/Al ratio, the more flexible is the modified geopolymer. This was especially observed in the case of a Si/Al ratio of about 1, where aluminosilicates formed "more flexible" poly(sialate) structures, as compared to a 3D network of poly(sialate-siloxo) and poly(sialate-disiloxo) exhibiting shrinkage and cracks. From the literature, it is known that such flexibility was observed when the molar Si/Al ratio exceeds 30, with the much higher content of Si in matrix constituents.

Mixing is typically carried out at ambient temperature, for a minimum of 1 minute and a maximum of 60 minutes. In this step after the addition of the alkaline silicate solution (so called water glass), silane may preferably be added to the gel, in order to improve adhesion of geopolymer in particular to carbon-based athermanous additives and later to the filled polymer. The concentration of silane is preferably in the range of from 0.01 to 10 wt. %, more preferably in the range of from 0.05 to 5 wt. %, most preferably from 0.1 to 3 wt. %.

Geopolymer or geopolymer composite may thus be modified by reaction with coupling agents, to obtain better adhesion to the vinyl aromatic expandable polymers. Different coupling agents may be used, depending on when the addition during the preparation of the geopolymer or the geopolymer composite takes place. However, this depends on the type of geopolymer used and the type of additive within the geopolymer composite.

Firstly, an adhesion of geopolymer or geopolymer composite to the polymer can be improved by its in situ modification (reaction) with silanes or organometallic titanates, zirconates (such us Ken-React produced by Kenrich Petrochemicals Inc.). The silane or titanate etc. can be added as weight percent per percent of geopolymer solid mass. It can be added in the range of 0.01-10.0 wt. % per 100 wt. % of geopolymer solid mass; in particular 0.1-5.0 wt. %, especially 0.5-3.0 wt. %.

Secondly, the adhesion of geopolymer or geopolymer composite to the vinyl aromatic polymer can be further improved by surface modification with silane or vinyl silane of the final powder form of prepared geopolymer or geopolymer composite. The silane or vinyl silane can be added as weight percent per 100 wt. % of powder. In can be added in the range of 0.01-10.0 wt. % per 100 wt. % of geopolymer solid mass; in particular 0.1-5.0 wt. %, especially 0.5-3.0 wt. %.

Another opportunity for hydrophobicity improvement is butadiene latex addition to the geopolymer gel. The resulting modified geopolymer or modified geopolymer composite has an improved adhesion to vinyl aromatic polymer, better dispersion of modified geopolymer or modified geopolymer composite in the polymer matrix, and improved mechanical properties. The concentration of butadiene latex is preferable in the range of from 1 to 50% wt. %, more preferable in the range of from 5 to 25 wt. %. The used latex can be butadiene copolymer latex eg. butadiene-styrene latex (e.g. LBS 3060 S from Synthos) and carboxylic modified butadiene latex e.g. (LBSK 5545 from Synthos).

Whilst various silanes can be used, the best adhesion performance is achieved when using aminopropyltriethoxysilane (e.g. Dynasylan AMEO from Evonik), aminopropyltrimethoxysilane (e.g. Dynasylan AMMO from Evonik), phenyltriethoxysilane (e.g. Dynasylan 9265 from Evonik), 3-methacryloxypropyltrimethoxysilane (e.g. Dynasylan MEMO form Evonik) and vinylthioethoxy-silane (e.g. Dynasylan VTMO from Evonik). When the silane is e.g. 3-methacryloxypropyltrimethoxysilane, the process further preferably comprises the addition of a butadiene latex in one or more of steps a), b) and c) (preferably, the addition of the butadiene latex is in one or more of steps a) and step b)).

Silane may also be added to the geopolymer composite in any one of step e), optional step f) and step g). Then, the silane is preferably selected from aminopropyltriethoxysilane, aminopropyltrimethoxysilane, phenyltriethoxysilane, 3-methacryloxypropyltrimethoxysilane, and mixtures thereof.

It is most preferred that silane is added in an amount of from 0.01 to 10 wt. %, more preferably from 0.05 to 5 wt. %, most preferably from 0.1 to 3 wt. %, based on the weight of modified geopolymer or modified geopolymer composite.

Also, it is preferred that the additive is an athermanous additive, preferably selected from the group consisting of a. carbon-based athermanous additives,
b. metal athermanous additives,
c. metal oxide athermanous additives, and
d. metal sulfide athermanous additives.

Preferably, the additive as used in combination with (preferably modified) geopolymer or as incorporated into (preferably modified) geopolymer composite is one or more selected from the group consisting of a. carbon black, cokes (for example a petroleum coke and/or metallurgical coke), graphitized carbon black, graphite oxides, various types of graphite (especially poor and amorphous forms with a carbon content in the range of from 50 to 90%) and graphene or graphene oxide and various types of anthracite,
b. titanium oxides, ilmenite, rutiles, chamotte, fly ash, fumed silica, hydromagnesite, huntite, barium sulphate, and mineral having perovskite structure,
c. metal oxides, preferably titanium oxides, iron oxides, silicon oxides, chromium oxides, nickel oxides and more based on metals from element table groups of IIIB, IV-VIIIA, I-VB,
d. metal sulfides, preferably nickel sulfide, tungsten sulfide, copper sulfide, silver sulfide, and more sulfides are possible,
e. nano particles of graphite oxides and titanium oxides, iron oxides, silicon oxides, chromium oxides, metal sulfides, metals such as nickel, barium sulphate and component having perovskite structure, tricalcium phosphate, preferably the (preferably modified) geopolymer comprises one or more carbon-based additives selected from the group of heat absorbers and heat reflectors presented above, in particular the carbon-based additive is carbon black, graphite, graphite oxide, graphene oxide, coke, anthracite or a mixture thereof.

The second and optional step b) is thus the incorporation of additives, preferably one or more athermanous additives. Preferably such additive could be carbon black, graphite, coke, anthracite, graphite oxide.

In particular, the following cokes could be used: petroleum coke, metallurgical coke, shot coke, sponge coke, fluid coke, beaded coke, needle coke, pitch coke or anode coke.

In particular, the following anthracites could be used: green anthracite, semianthracite, anthracite, meta-anthracite or gas calcined anthracite and electrically calcined anthracite or dealkalized and desulphurized types of anthracite.

Additionally, other types of carbon based additive are possible, such as sea coal, graphene oxide, nanotubes or carbon fibers.

In a preferred embodiment, additive a. is selected from coke, graphitized carbon black, graphite oxides, graphite, anthracite, graphene oxide, and nano-graphite and carbon nanotubes (single and multilayer).

Thus, in a preferred embodiment of all aspects of the invention, additive a. is selected from coke, graphitized carbon black, graphite oxides, graphite, anthracite, graphene oxide, and nano-graphite and carbon nanotubes (single and multilayer). Most preferred in all embodiments of the invention is that the athermanous additive is a carbon athermanous additive selected from graphene oxide, nano-graphite, and mixtures thereof.

Alternatively, metal oxides could be added, preferably, titanium dioxide, iron oxide, chromium oxide, silicon oxide or nickel oxide or their nanoforms.

Further alternatively, metal sulfides such as tungsten sulfide or nickel sulfide are possible as additives.

After (optional) additive incorporation, the high shear mixing is continued, and further geopolymerization takes place, and additive is physically encapsulated or chemically reacted by growing chains of geopolymer, thus the surface becomes modified.

The additive, or a minimum of two additives, is preferably added in an amount of from 0.01 to 80 wt. %, more preferably from 0.05 to 60 wt. %, most preferably from 0.1 to 50 wt. % depending on the type of the additive or additive mixture, based on the weight of geopolymer composite. Different mixtures and different ratios between the additives are possible. After addition of additive, or mixture of at least two additives from the above proposed, the thixotropic gel is further high speed mixed, to result in a homogenous consistence. Water can then be added, to regulate the final viscosity. The water is added in a preferred ratio from 1/10 to 10/10 or depending on additive type and its bulk density as well as hydrophilic properties and specific surface.

It is very much preferred that the process includes optional dealkalization step f). Preferably, step f) comprises the addition of an acid solution, and subsequent drying. In particular, step f) comprises addition of an acid solution, washing with water, and subsequent drying.

The second preferred embodiment for the geopolymer or geopolymer composite production process further may comprise modification with one or more water-soluble compounds, preferably the modification is in one or more of step f) and step g), resulting in modified geopolymer or modified geopolymer composite, respectively. The water-soluble compound is preferably selected from phosphorus compounds, nitrogen compounds, copper compounds, silver compounds, zinc compounds, tin compounds, and magnesium compounds. Preferably, the modification is with a phosphorus compound, in particular with a phosphorus compound selected from phosphoric acid and ammonium polyphosphate.

Also, the modification of geopolymer or geopolymer composite gives materials having a better stability, such as improved adhesion to the polymers into which they are incorporated. Moreover, the modification allows one to use certain types of additives that would otherwise be unsuitable for use in expandable vinyl aromatic polymers and expanded vinyl aromatic polymer foams.

Thus, the geopolymer or geopolymer composite is produced in several process steps in which if needed additive (such as coke or anthracite or graphene oxide or metal oxide or sulfide or metal) becomes encapsulated by chemical and physical bonding into the geopolymer matrix. This type of geopolymer is suitable for performing a self-extinguishing action and further reducing the thermal conductivity properties of vinyl aromatic polymers and expanded foam products made thereof. Additionally, it was found that the self-extinguishing effect could be enhanced when a relatively small amount of modifier, e.g. a phosphorus compound such as phosphoric acid or ammonium polyphosphate, is used to alter the surface of geopolymer or geopolymer composite. It was found that this surface modification can help to reduce the amount of brominated flame retardant or completely eliminate the need to use any brominated flame retardant.

Also, geopolymer or geopolymer composite suspended in water can be ion exchanged. In was discovered that, following the dealkalization in which exchange of sodium or potassium cations by hydrogen cations is realized, or alternative to such dealkalization, an ion exchange can be performed. Such ion-exchanged particles of modified geopolymer or of modified geopolymer composite (incorporating ions of Ag, Zn, Cu, Cu, Ni, Sn, Mg) further improves the reduction of thermal conductivity of polymeric foams, acting additionally as antimicrobial agent.

Final step g) of the process may thus comprise
several filtration steps, preferably two or more steps, followed by salts washing and later repulpation in demineralized water or an acid solution in demineralized water, while such repulpation is followed by filtration and salts washing, modification of geopolymer or geopolymer composite in filtration and/or repulpation by a suitable acid or via ion exchange using a suitable water-soluble salt, and final repulpation of washed and/or modified geopolymer or geopolymer composite and subsequent spray drying to obtain a powder.

In step g), the surface modification may be performed, for instance by treating the precipitated cake with a demineralized water solution of acid, preferably phosphoric acid or phosphates or its salts or polyphosphates or its salts. The surface modification by phosphorus and/or nitrogen based compounds may thus be performed with the use of an aqueous solution. The aqueous solution of the phosphorus and/or nitrogen based compound is transferred in one or more cycles through the filter press. If this step is needed because of the application of the resultant modified geopolymer or modified geopolymer composite, it is often performed before the membrane squeeze and vacuum drying in the membrane filter press. The modification can alternatively be an ion exchange, with the use of a water solution of a salt such as copper chloride, silver nitrate, or magnesium sulphate, or some other salt which is soluble in cold or hot water.

In step e) of the second preferred embodiment for the geopolymer or geopolymer composite production process, there are two alternatives, namely e1) decantation, or
e2) adding of an organic phase, emulsifying, and stripping of the organic phase.

In the first alternative, the process includes step e1), decantation. In this preferred alternative embodiment e1), the process preferably comprises e1a) applying high shear mixing and ultrasound with high energy, to induce cavitation,
e1b) optional addition of acid, preferably addition of acid,
e1c) decantation,
e1d) optional membrane filtration, and precipitate cake washing.

In the second alternative embodiment of the process, the process includes step e2), namely adding of an organic phase, emulsifying, and stripping of the organic phase, and the process preferably comprises e2a) adding of an organic phase,
e2b) emulsifying the sol-gel,
e2c) applying high shear mixing and ultrasound with high energy, to induce cavitation,
e2d) steam stripping to remove the organic phase, and
e2f) dispersion of the geopolymer or the geopolymer composite in water, preferably deionized water.

In a third preferred embodiment, modified geopolymer or geopolymer composite is produced in accordance with the process of international patent application entitled "Modified geopolymer and modified geopolymer composite and process for the production thereof" (PCT/EP2017/068371), filed on even date herewith, the disclosure of which application is incorporated herein in its entirety. PCT/EP2017/068371 claims priority from EP16461540.3, filed Jul. 20, 2016. According to this alternative process, which is based on WO2016/113321 A1, modified geopolymer or modified geopolymer composite is prepared in a process comprising a) mixing of precursor for aluminate and silicate in alkaline solution, to form a sol-gel,
b) optionally adding of one or more additives to the sol-gel, to form a filled sol-gel,
c) mixing of the sol-gel or the filled sol-gel, to form geopolymer or filled geopolymer,
d) curing, drying and milling of the geopolymer or filled geopolymer, to form particles of geopolymer or of geopolymer composite,
e) optional dealkalization of the particles of geopolymer or of geopolymer composite, to reduce the content of alkali metal cation within the structure of the particles,
f) first filtration, and
g) second filtration,
wherein the process further comprises modification with one or more water-soluble compounds,
and
h) obtaining the modified geopolymer or modified geopolymer composite.

Again, step a) is preferably performed by mixing of precursor for aluminate and silicate, to form a sol-gel, wherein the mixing is under alkaline conditions.

Phosphorus- and/or Nitrogen-Based Flame Retardant

The invention further requires that, in addition to geopolymer or geopolymer composite, phosphorus- and/or nitrogen-based flame retardant is used.

With regard to the phosphorus-based flame retardant a), it is preferably selected from red phosphorus, organic and inorganic phosphates, phosphonates, phosphinates, and phosphoramidates. The organic phosphate may be selected from triphenyl phosphate (TPP), resorcinol bis(diphenylphosphate) (RDP), bisphenol A bis(diphenylphosphate) (BADP), tricresyl phosphate (TCP), and resorcinol bis(2,6-dixylenylphosphate) (RDX). The phosphinate may be selected from aluminium phosphinates, calcium phosphinates and zinc phosphinates. The phosphoramidate may be 9,10-Dihydro-9-oxa-10-phosphaphenanthrene-10-oxide (DOPO).

The nitrogen-based flame retardant b) may be selected from hindered amine stabilizer, ammonium octamolybdate, melamine octamolybdate, benzoguanamine, tris(hydroxyethyl) isocyanurate, allantois, glycoluryl, melamine, melamine cyanurate, dicyandiamide, guanidine, carbodiimides, condensation products of melamine, and derivatives thereof.

The phosphorus/nitrogen-based flame retardant c) is preferably selected from melamine phosphate, melamine pyrophosphate, melamine polyphosphate ammonium polyphosphate, and ethylene diamine phosphate.

Further nitrogen-containing flame retardants, phosphorus-containing flame retardants, and phosphorus/nitrogen-containing flame retardants are disclosed in EP2899222 A1, US2004/227130A1, CN103980313 A, and CN104341612 A.

The nitrogen retardant preferably comprises condensation products of melamine. By way of example, condensation products of melamine are melem, melam, or melon, or compounds of this type with a higher condensation level, or else a mixture of the same, and, by way of example, may be prepared by the process described in WO96/16948.

The phosphorus/nitrogen flame retardants preferably comprise reaction products of melamine with phosphoric acid or with condensed phosphoric acids, or comprise reaction products of condensation products of melamine with phosphoric acid or condensed phosphoric acids, or else comprise a mixture of the specified products.

The reaction products with phosphoric acid or with condensed phosphoric acids are compounds which arise via reaction of melamine or of the condensed melamine compounds, such as melam, melem, or melon etc., with phosphoric acid. By way of example, these are dimelamine phosphate, dimelamine pyrophosphate, melamine phosphate, melamine pyrophosphate, melamine polyphosphate, melam polyphosphate, melon polyphosphate, and melem polyphosphate, and mixed polysalts, e.g. those described in WO98/39306.

It is preferred in all embodiments of the present invention that the non-brominated flame retardant ii) is a non-halogenated flame retardant.

Preferably, the geopolymer or geopolymer composite has an average particle size (D50) in the range of 0.1 to 10 μm.

II) Process for the Production of Expandable Polymer Granulate

In a second aspect, the invention relates to process for the production of expandable polymer granulate by an extrusion or a suspension process, the process comprising the addition of i) one or more of
  a) a geopolymer;
  b) a combination of a geopolymer with an athermanous additive; and
  c) a geopolymer composite derived from geopolymer and comprising athermanous additive,
and
ii) one or more non-brominated flame retardants selected from
  a) phosphorus-based flame retardants,
  b) nitrogen-based flame retardants, and
  c) phosphorus/nitrogen-based flame retardants.

Preferably, the polymer is a vinyl aromatic polymer.

In the second aspect, the present invention thus relates to a process for the production of expandable (vinyl aromatic) polymer in the form of granulate of so-called expandable particles (micro-pellets or beads). There are two embodiments, namely (1) an extrusion process (e.g. XEPS) and (2) a suspension polymerization process (e.g. EPS). In both types of processes, incorporation of i) and ii) favourably contributes to both the process conditions and the properties of the product.

In the first embodiment of this aspect, the invention relates to an extrusion process for the production of expandable vinyl aromatic polymers, preferably by twin-screw extrusion consisting of a two-step mixing of the additive and flame retardant in two twin-screw extruders. Mixing takes place in a side twin screw extruder to which the additive (modified geopolymer, or combination of modified geopolymer with additive or mixture of additives, or modified geopolymer composite) is added through the two side feeders, in order to better degas the melt from excess of water and air. In this way, a filler masterbatch is created "in situ" and the filled melt is then (preferably directly, i.e. as melt) transferred to the main 32D twin-screw extruder.

The main extruder is filled with general purpose polystyrene (the same as the one dosed to the side twin screw extruder), and non-brominated flame retardant. Then, the melt is impregnated with blowing agent (propellant, typically pentanes, or a suitable mixture). The melt containing all additives is then cooled in a single screw extruder. The melt is then downstream processed in a pressurized underwater pelletization process, to obtain vinyl aromatic polymer granulate. The granulate is finally coated with a mixture of zinc (or magnesium) stearate, glycerine monostearate and glycerine tristearate. If a brominated flame retardant is present, the modified geopolymer or modified geopolymer composite preferably has a low alkali content.

According to the first embodiment of aspect (II), expandable vinyl aromatic polymer granulate is preferably prepared in an extrusion process as shown in detail in WO 2016/113321 A1.

The use of a brominated flame retardant can in accordance with the present invention be reduced or even be dispensed with. Especially if no brominated flame retardant is present, the geopolymer or geopolymer composite as used in combination with ii) non-brominated flame retardant need not have a low alkali content.

In the second embodiment of the fourth aspect of the invention, expandable vinyl aromatic polymer is prepared in a suspension polymerization process.

In the first step of a preferred suspension process, radically initiated copolymerization preferably takes place in the presence of powder of a. geopolymer, or b. combination of geopolymer with additive, or c. geopolymer composite, each preferably hydrophobized on the surface by the coupling agents, in particularly by vinyl silanes. In the next step, mixing of prepolymer as obtained in first step with vinyl aromatic polymer takes place, preferably in a twin-screw co-rotating extruder. Underwater pelletization gives a masterbatch in the form of granulate. Then, this masterbatch is preferably dissolved in styrene, together with non-brominated flame retardant. Water is then added, followed by peroxide and surfactants. The polymerization is continued at a temperature in a range of from 75 to 130° C. Next, the resultant polymer is centrifuged to remove the water from the polymer particles (granulate), the particles are dried and are finally coated with a mixture of magnesium (or zinc) stearate and/or mono- and/or di- and/or tristearate of glycerine.

The suspension process preferably comprises the steps as described in more detail in WO 2016/113321 A1.

III) Composition

In a third aspect, the invention relates to a composition comprising one or more polymers, the composition further comprising i) one or more of
  a) a geopolymer;
  b) a combination of a geopolymer with an athermanous additive; and
  c) a geopolymer composite derived from geopolymer and comprising athermanous additive,
and
ii) one or more non-brominated flame retardants selected from
  a) phosphorus-based flame retardants,
  b) nitrogen-based flame retardants, and
  c) phosphorus/nitrogen-based flame retardants.

The composition may be in the form of an expandable granulate, wherein the polymer is a vinyl aromatic polymer, the granulate further comprising one or more propellants. Preferably, the granulate is obtainable according to the process of the second aspect.

Preferably, the polymer is selected from vinyl polymer, polyurethane, polyolefin, polycarbonate, polyester, polyamide, polyimide, silicone and polyether. More preferably, the polymer is selected from vinyl aromatic polymer, polyethylene and polypropylene, most preferably the vinyl aromatic polymer is polystyrene. The composition can be in the form of expandable vinyl aromatic polymer granulate, in the form of expanded vinyl polymer foam, or in the form of a masterbatch.

Further preferred is expandable vinyl aromatic polymer granulate, and an expanded foam products made thereof, which comprises vinyl aromatic polymer prepared from styrene monomer with optional incorporation of one or more vinyl comonomers, and a) 0.01-50 wt. % (by polymer weight, including solid and, if any, liquid additives, but exclusive of propellant) of geopolymer in powder form, with a particle size from 0.01 μm to 200 μm, measured using a Malvern Mastersizer apparatus according to ISO 13320-1, and a BET surface in the range from 0.01 to 10000 m$^2$/g, measured using a Gemini 2360 surface area analyzer from Micromeritics according to ISO 9277:2010, b) 0.01-50 wt. % (by polymer weight, including solid and, if any, liquid additives, but exclusive of propellant) of a combination of geopolymer with carbon blacks or mixture of at least two types of carbon blacks. The ratio of geopolymer to carbon black or mixtures of at least two carbon blacks is typically in a range of from 1/100 to 100/1. The weight ratio of first carbon black to the second, third or fourth carbon black is typically in the range of from 1/100 to 100/1; with the same ratio a mixture of second to third or third to fourth carbon black is possible. A maximum of 10 different carbon blacks could be used, in a respective ratio in the range of from 1/100 to 100/1, and/or c) 0.01-50 wt. % (by polymer weight, including solid and, if any, liquid additives, but exclusive of propellant) of geopolymer composite in powder form, with a particle size in a range of from 0.01 μm to 200 μm, measured using a Malvern Mastersizer apparatus according to ISO 13320-1, and a BET surface in a range of from 0.01 to 10,000 m$^2$/g, measured using a Gemini 2360 surface area analyzer from Micromeritics according to ISO 9277:2010.

Expandable vinyl aromatic polymer granulate may be expanded to form foam with a uniform structure independently from the concentration of geopolymer or geopolymer composite in the foam. A uniform structure is characterized by the cell size distribution, as measured by a statistical analysis of the picture prepared by an optical microscopy measurement.

Preferably, and according to the third aspect, the invention relates to the expandable vinyl aromatic polymer granulate (particles) as obtainable according to the second aspect, preferably in an extrusion or a suspension processes.

The expandable vinyl aromatic polymer granulate comprises polymer, one or more propellants, geopolymer additive i) and non-brominated flame retardants ii), where i) is a. geopolymer, or b. a combination of a geopolymer with an additive, but is preferably c. the geopolymer composite as prepared from geopolymer and a suitable additive such as those from the group of carbon based athermanous additives, with optional modification of the geopolymer.

The vinyl aromatic polymer used in all aspects of the invention is in particular polystyrene or a vinyl aromatic styrene copolymer. In the copolymer, a part of styrene monomer is substituted with unsaturated comonomers, the reactivity of which is close to styrene monomer's reactivity, such as p-methyl styrene and its dimers, vinyl toluene, t-butyl styrene or divinylbenzene. For the extrusion process and suspension process, typically used vinyl aromatic polymers have a different number average molecular weight.

In the extrusion process, it is preferred to use a general purpose type of polystyrene (or a copolymer with unsaturated styrene derivative) with a number average molecular weight (Mn) of from 40 to 100 kg/mol, preferably of from 50 to 80 kg/mol, more preferably of from 55 to 70 kg/mol, and a suitable polydispersity of Mw/Mn in a range of from 2.0 to 5.0, preferably of from 2.5 to 4.0, more preferably of from 3.0 to 3.5, and Mz/Mw in the range of from 1.5 to 2.5.

The vinyl aromatic polymer as produced in the suspension process preferably has a number average molecular weight (Mn) from 50 to 120 kg/mol, preferably of from 60 to 100 kg/mol, more preferably of from 70 to 90 kg/mol, and a suitable polydispersity Mw/Mz in a range of from 2.0 to 4.5, preferably from 2.5 to 4.0, more preferably from 3.0 to 4.0, and Mz/Mw in the range of from 1.5 to 2.5.

The composition when in the form of expanded vinyl polymer foam has a density of from 8 to 30 kg/m$^3$, and a thermal conductivity (as measured according to ISO 8301) of from 25 to 35 mW/K·m).

Preferably, the expanded vinyl polymer is a vinyl aromatic polymer. More preferably, the foam is obtainable by expansion of the granulate according to the second aspect.

It is noted that, unlike the properties of the starting materials, the properties of additives as contained in the granulate or foam are notoriously difficult to determine. It is often considered more appropriate to characterize the additives in granulate and foam with reference to the properties of the additives as initially used.

It is further noted that, whenever reference is made in the description to an "additive", this is in all embodiments and aspects of the invention preferably a reference to an "athermanous additive", as athermanous additives are most preferred additives.

The advantages of the present invention become apparent from the following examples. Unless indicated otherwise, all percentages are given by weight.

Moreover, whenever reference is made in the description to an amount of any additive "by weight of polymer", this refers to the amount of the additive by weight of polymer component inclusive of (solid and, if any, liquid) additives, but exclusive of propellant.

EXAMPLES

The below examples show a synergistic self-extinguishing effect in vinyl aromatic polymer foams, when geopolymer composite was used in combination with common nitrogen-phosphorus flame retardants.

The following geopolymers were prepared with the process described below (Table 1).

TABLE 1

| Geopolymer composites | | | |
|---|---|---|---|
| No. | 1 | 2 | 3 |
| Geopolymer matrix (wt. %) | 50 | 43.65 | 45 |
| Ranco 9895 (wt. %) | 50 | 43.65 | 45 |
| Phosphoric acid (wt. %) | – | – | 5 |
| Ammonium polyphosphate solution/ Exolit AP 420/(wt. %) | – | 12.7 | 5 |
| Sodium (wt. %) | 0.02 | 0.02 | 0.01 |
| 1$^{st}$ filtration | + | + | + |
| Process water cake washing | + | + | + |
| Demineralized water cake washing | – | + | + |
| Acidic washing with HCl solution (0.1%) | + | + | + |
| Repulpation in HCl acid solution (0.1%) | + | – | – |
| Repulpation in H$_3$PO$_4$ solution (1.5%) | – | – | + |
| Repulpation in APP solution (7.6%) | – | + | – |

TABLE 1-continued

Geopolymer composites

| No. | 1 | 2 | 3 |
|---|---|---|---|
| 2$^{nd}$ filtration | + | + | + |
| Demineralized water cake washing | + | − | − |
| H$_3$PO$_4$ introduced via washing (1.5%) | − | − | + |
| APP introduced via washing (3%) | − | − | + |

Geopolymer Composite Preparation

The components: 39.6 kg of a powder mixture which comprises 19.8 kg of metakaolinite from České Lupkové Závody, a.s., Czech Republic, and 19.8 kg of furnace slag from ironworks Katowice, Poland and 31.7 kg of sodium water glass with a molar module of 1.82 from Rudniki, Poland were charged into a high speed screw conical mixer having a volume of 0.2 m$^3$ and were mixed over 1 min. with a speed of 300 rpm, to obtain a thixotropic sol-gel. Then, the carbon additive, namely petroleum coke (Ranco 9895 from Richard Anton KG having a mean diameter particle size of 3 μm, a BET surface area of 28.5 m$^2$/g, a total surface area of pores 12.1 m$^2$/g, and a sulphur content of 10100 ppm) was added in an amount of 52 kg, and 46.8 l of water was added subsequently to the gel and mixed during the next 1 min, also with a high speed of 300 rpm. After that, the viscous, homogenous gel was discharged from the mixer directly to the open mould made of polished stainless steel in a total amount of 170 kg. The mould was then closed and left for 24 h to perform geopolymerization. After 24 hours, the mould was opened and transported to the drier to perform a drying process, for 8 h at a temperature of 70° C., and for 16 h at a temperature of 120° C. Under these conditions, the geopolymer composite was dried over 24 h, and approx. 29 wt. % of water excess was evaporated from the material. Still approx. 10% of water remained in the material.

The dried geopolymer composite block was then placed into a crusher to obtain the granulate. The granulate with an average particles size of 10 mm was jet milled with the use of hot air as milling medium, to obtain free flowing powder.

The fine powder, containing about 3 wt. % of water (amount of approx. 107 kg) was then placed in a 0.6 m$^3$ in heated dissolver (reactor), equipped with a high speed agitator and a ribbon stirrer turning closely to the dissolver walls. Immediately thereafter, 214 l of filtrated process water were charged into the dissolver and mixing was started simultaneously. An amount of 46.2 kg of concentrated aqueous hydrochloric acid (30%) was then over 5 min added to the reactor and dealkalization was performed. The starting pH, as measured before acid addition, was 13, and after 60 min of mixing and dealkalization, the final pH was 7.5. The water (filtrate) having a conductivity of about 80,000 μS/cm was filtrated from the powder of geopolymer composite and a precipitate was obtained, containing approx. 50 wt. % of water. Then, a portion of process water was used to wash remaining sodium chloride and other chlorides from the precipitate. Washing was continued for 20 min, to obtain a filtrate having conductivity below 400 μS/cm. Alternatively, demineralized water could be used, reducing the filtrate conductivity below 300 μS/cm. To help destruct a thixotropic effect, the washing with 0.1% hydrochloric acid solution could be performed after the wash with process or demineralized water. After that, a membrane squeeze of about 16 bar was applied, to increase the solids content to 55 wt. %. The precipitate was removed from the press, granulated and loaded to a repulpation dissolver with the same mixing system as for the dealkalization reactor. Further salts elution in diluted solution of hydrochloric acid (0.1%) and deionized water was performed. Following repulpation, the slurry was filtrated and washed for about 20 min, to obtain a filtrate with conductivity below 100 μS/cm.

Optionally, and to further improve self-extinguishing of vinyl aromatic foams with the use of geopolymeric composite, 3 wt. % of a solution of phosphoric acid (preferably 75% concentrated) in demineralized water may be pumped through the filter press to modify the surface of geopolymer or geopolymer composite. The precipitate with water content of about 45 wt. % was then finally vacuum dried over 4 h at a temperature 120° C. and pressure level of about 0.2 mbar. The dry precipitate, containing of about 10% of water and 5 wt. % of phosphoric acid in its structure, was then granulated and deagglomerated in an impact mill, to receive a fine powder with a D50 of about 2.7 μm as presented in FIGURE. The 5 wt. % content of phosphoric acid was analysed in the geopolymer. The content of analysed sodium was 200 ppm.

Alternatively, the geopolymer or geopolymer composite modification in the repulpation step could be performed by creating 1-15% solutions with water. Further, modification could be more sufficient if the solution of H$_3$PO$_4$ or APP is used after demineralized water washing in the second step of membrane filtration. When the modification is done in the repulpation step, the washing step with the use of demineralized water must be excluded in that case, so as to not elute the modifier.

In the end, a geopolymer composite (composite 1) powder with an average particles size (D50) of 2.7 μm is obtained, containing D90=5.9 μm, D99=10.1 μm (FIGURE), BET 31.0 m$^2$/g and total surface area of pores 17.5 m$^2$/g.

From all performed analyses of the quality of obtained geopolymers or geopolymer composites, the sodium content is presented as the most important one from an improved process point of view. It will be shown below how the sodium content and the phosphorus compound content influence the foam's self-extinguishing properties, and to which content, in the foam, brominated flame retardant could be reduced.

1. Sodium Analysis Description

A crucible with 0.05 g dried sample is placed in the oven for 5 h at 500° C. for burning. The ash after burning is cooled down, in the next step ca. 10 ml deionized water with 1 ml HCl (35-38%) is added to the crucible with sample, and the content is heated using a laboratory hotplate at 140° C. for 30 min. The sample is cooled down and transferred through the filter (cleaned beforehand for a minimum of 3 times using deionized water) into the 100 ml flask, in the next step 8 ml 1 M nitric acid with 4 ml spectral buffer of cesium chloride (2.5% Cs) is added. Simultaneously with the sample for analysis one control (blank) sample is prepared using the same procedure and the same reagents.

The sample solution as prepared applying the procedure described above is measured by Atomic Absorption Spectrometer, using a device AA iCE 3500 GFS35Z, and following parameters: working mode: absorption, wave length: 589.0 nm, gap: 0.2 nm, The presented analytical procedure is based on the standard defining Na analysis PN-ISO 9964-1:1994+Ap1:2009, sample preparation for measurement is based on internal procedure standard 61/A issue 3 dated 30 Apr. 2009.

2. Phosphorus Content

The content of H$_3$PO$_4$ and ammonium polyphosphate content were concluded from x-ray spectroscopy (XRF), by measuring the content of phosphorus, calculated as content of $P_2O_5$. XRF was performed with the use of a vessel for powders and oils analysis on the Prolen foil with thickness of 4 μm. A WD-XRF model S8 Tiger apparatus from Bruker was used to perform analysis.

3. Specific Surface Area

The specific surface area was determined using a Gemini 2360 (Micromeritics) device. The measurement minimum of the Gemini 2360 apparatus for specific surface was from 0.01 m²/g, the total surface range was from 0.1 to 300 m², and the pore size starting from $4 \cdot 10^{-6}$ cm³/g. Analysis was performed in a range $P/P_0$ from 0.05 to 0.3. Degasification of sample was made in an inert gas atmosphere of nitrogen (with flow of 50 cm³/min.). Later, the sample was dried over 2 h at a temperature of 110° C. Nitrogen was used as measurement gas.

4. Mercury Porosimetry

The pore size of the samples was measured using an Autopore IV 9500 device according to an internal standard. Mercury contact angle is 130°. Before the measurement, each sample was conditioned for 2 h at 200° C.

Expandable Vinyl Aromatic Polymer Preparation

A mixture of vinyl aromatic polymer in the form of granules, containing 0.5-5.0 wt. % of P/N flame retardant, 0.1 wt. % of bicumyl and 0.15 wt. % of nucleating agent (Polywax 2000), was dosed to the main hopper of the main 32D/40 mm twin-screw co-rotating extruder. The melt temperature in main extruder was 180° C.

The geopolymer composite powder as prepared in EXAMPLE 1 in a concentration of 10 wt. % was dosed to the side arm (54D/25 mm) twin-screw co-rotating extruder via two side feeders, and the vinyl aromatic polymer (in the form of granules) was dosed to the main hopper of this extruder. The melt, containing 30 wt. % of concentrated geopolymer additive, was transported to the main extruder. The melt temperature inside the extruder was 190° C.

The blowing agent (n-pentane/isopentane mixture 80/20%) was injected to the main 32D/40 mm extruder downstream from the injection of the melt from the side twin-screw extruder. The concentration of blowing agent was 5.5 wt. %, calculated on total mass of product.

The melt of vinyl aromatic polymer containing 0.5-5.0 wt. % of P/N flame retardant, bicumyl, nucleating agent, geopolymer composite and blowing agent was transported to the 30D/90 mm cooling extruder and pumped through a 60 mm length static mixer, melt pump, screen changer, diverter valve and extruded through the die head with 0.75 mm diameter holes, and underwater pelletized by the rotating knifes. Downstream, the rounded product, a granulate with a particle size distribution of 99.9% of the fraction 0.8-1.6 mm was centrifuged to remove the water, and was finally coated by the suitable mixture of magnesium stearate with glycerine monostearate and tristearate. The melt temperature in the cooling extruder was 170° C.

The coated beads were expanded, to measure the final general properties of expanded foam composite:
1. Thermal conductivity according to standard ISO 8301.
2. Mechanical properties (compressive and bending strength) according to standard EN 13163.
3. Flammability according to tests methods: EN ISO 11925-2 and DIN 4102 B2.
4. Dimensional stability under specified temperature and humidity conditions of expanded foam were determined according to standard PN-EN 1604+AC, which is normally used for XPS materials.

The expandable granulate with a particle size distribution 0.8 to 1.6 mm was in the pre-expander vessel treated for 50 sec. with steam having a pressure of 0.2 kPa, and was then dried in a connected fluid bed drier. The obtained beads' density was 15 kg/m³. Then the expanded beads were conditioned in a silo for 24 h and introduced to the block mould with dimensions of 1000×1000×500 mm. Steam having a pressure of 0.7 kPa was used to weld the beads, and to obtain moulded blocks having a density of 15.5 kg/m³. The mould cooling time in this case was 70 sec. The ready block was cut into plates and then specimens taken after 6 days of conditioning at room temperature.

Example 1 (Geopolymer Composite 1 Used)

This example is a comparative one, to show that geopolymer composite does not sufficiently act as effective flame retardant by itself. The self-extinguishing test results as obtained are presented in Table 2.

Example 2 (Geopolymer Composite 1 Used)

This example is comparable with Example 1 and it gives reference that also a combination of synergist (bicumyl) and geopolymer composite does not give the required self-extinguishing properties for EPS foam. The self-extinguishing test results as obtained are presented in Table 3.

Example 3 (No Geopolymer Composite Used)

This example is a comparative one, to show that addition of ammonium polyphosphate (only) in an amount of 2 wt. % is not sufficient to make self-extinguished foams. The self-extinguishing test results as obtained are presented in Table 4.

Example 4 (No Geopolymer Composite Used)

This example is comparable with Example 3, except that the ammonium polyphosphate content was increased up to 5 wt. %, to show that this does not make a big difference in terms of the self-extinguishing effect in EPS foams. The self-extinguishing test results as obtained are presented in Table 5.

Example 5 (Geopolymer Composite 1 Used)

This example is the first one with the use of geopolymer composite in combination with ammonium polyphosphate (2 wt. %). In this case for the first time a self-extinguishing effect was discovered. The self-extinguishing test results as obtained are presented in Table 6.

Example 6 (Geopolymer Composite 1 Used)

This example is fully comparable with Example 5, and shows that an ammonium polyphosphate content (5 wt. %) has the result of strengthening the self-extinguishing of EPS foam. It was the second example showing a synergistic effect between geopolymer composite and ammonium polyphosphate. The self-extinguishing test results as obtained are presented in Table 7.

Example 7 (Geopolymer Composite 1 Used)

This example is comparable with Example 5. In this case instead adding of ammonium polyphosphate Exolite 422 (D50 17 μm), the grade Exolite 423 (D50 8 μm) was added. It is shown that smaller particles of ammonium polyphosphate have a better surface contact with geopolymer composite, thus self-extinguishing of EPS foam was improved. The self-extinguishing test results as obtained are presented in Table 8.

Example 8 (Geopolymer Composite 1 Used)

In this example, instead of ammonium polyphosphate, 9,10-dihydro-9-oxa-10-phosphaphenanthrene-10-oxide (DOPO)/Struktol Polyphlox 3710/was used, in an amount of 2 wt. %. This example is comparable with examples 5 and 7 and shows that other types of P/N flame retardants can have a synergistic effect with geopolymer composite for self-extinguishing of EPS foam. The self-extinguishing test results as obtained are presented in Table 9.

Example 9 (Geopolymer Composite 2 Used)

This example is comparable with Example 5. It shows that, when ammonium polyphosphate (APP) is placed in the mezo-, micro-structure of geopolymer composite via wet method modification, the self-extinguishing effect of EPS foam is strengthened significantly with the use of even lower amount of APP, in comparison to Example 5 or 7. The self-extinguishing test results as obtained are presented in Table 10.

Example 10 (Geopolymer Composite 3 Used)

This example is comparable with Example 9 and shows that complex wet modification with the use of phosphoric acid with ammonium polyphosphate (APP) (at separated stages of geopolymer composite preparation) and as well addition to the polymer of D50 8 μm Exolite AP 433 in an amount of 0.5 wt. % only can help to decrease the total amount of APP (more expensive then $H_3PO_4$) in ESP foam, while maintaining the self-extinguishing effect at the same level.

TABLE 2

DIN 4102 B2

| Sample | Maturing time (days) | Flame height (cm) | Flaming time (s) | Dripping | Ignition |
|---|---|---|---|---|---|
| EXAMPLE 1 | 5 | 16.5 | >20 | 2 | YES |
|  |  | 18.3 | >20 | 2 | YES |
|  |  | 18.4 | >20 | 3 | YES |
|  |  | 19.1 | >20 | 4 | YES |
|  |  | 18.1 | >20 | 4 | YES |

TABLE 3

DIN 4102 B2

| Sample | Maturing time (days) | Flame height (cm) | Flaming time (s) | Dripping | Ignition |
|---|---|---|---|---|---|
| EXAMPLE 2 | 5 | 11.2 | >20 | 5 | YES |
|  |  | 13.5 | >20 | 4 | NO |
|  |  | 14.6 | >20 | 6 | NO |
|  |  | 15.9 | >20 | 8 | NO |
|  |  | 13.7 | >20 | 3 | NO |

TABLE 4

DIN 4102 B2

| Sample | Maturing time (days) | Flame height (cm) | Flaming time (s) | Dripping | Pater ignition |
|---|---|---|---|---|---|
| EXAMPLE 3 | 5 | 12.3 | >20 | 2 | YES |
|  |  | 10.6 | >20 | 1 | YES |
|  |  | 14.0 | >20 | 3 | YES |
|  |  | 0.0 | 0 | 0 | NO |
|  |  | 13.1 | >20 | 3 | YES |

TABLE 5

DIN 4102 B2

| Sample | Maturing time (days) | Flame height (cm) | Flaming time (s) | Dripping | Pater ignition |
|---|---|---|---|---|---|
| EXAMPLE 4 | 5 | 14.1 | >20 | 0 | NO |
|  |  | 7.5 | >20 | 0 | NO |
|  |  | 0.0 | 0 | 0 | NO |
|  |  | 9.8 | >20 | 2 | YES |
|  |  | 0.0 | 0 | 0 | NO |

TABLE 6

DIN 4102 B2

| Sample | Maturing time (days) | Flame height (cm) | Flaming time (s) | Dripping | Pater ignition |
|---|---|---|---|---|---|
| EXAMPLE 5 | 5 | 5.0 | >20 | 0 | NO |
|  |  | 0.0 | 0 | 0 | NO |
|  |  | 8.4 | >20 | 1 | NO |
|  |  | 0.0 | 0 | 0 | NO |
|  |  | 0.0 | 0 | 0 | NO |

TABLE 7

DIN 4102 B2

| Sample | Maturing time (days) | Flame height (cm) | Flaming time (s) | Dripping | Pater ignition |
|---|---|---|---|---|---|
| EXAMPLE 6 | 5 | 0.0 | 0 | 0 | NO |
|  |  | 0.0 | 0 | 0 | NO |
|  |  | 0.0 | 0 | 0 | NO |
|  |  | 0.0 | 0 | 0 | NO |
|  |  | 0.0 | 0 | 0 | NO |

TABLE 8

DIN 4102 B2

| Sample | Maturing time (days) | Flame height (cm) | Flaming time (s) | Dripping | Pater ignition |
|---|---|---|---|---|---|
| EXAMPLE 7 | 5 | 4.5 | >20 | 0 | NO |
|  |  | 0.0 | 0 | 0 | NO |
|  |  | 0.0 | 0 | 0 | NO |
|  |  | 0.0 | 0 | 0 | NO |
|  |  | 0.0 | 0 | 0 | NO |

TABLE 9

| | DIN 4102 B2 | | | | |
|---|---|---|---|---|---|
| Sample | Maturing time (days) | Flame height (cm) | Flaming time (s) | Dripping | Pater ignition |
| EXAMPLE 8 | 5 | 3.6 | 9 | 0 | NO |
| | | 0.0 | 0 | 0 | NO |
| | | 0.0 | 0 | 0 | NO |
| | | 0.0 | 0 | 0 | NO |
| | | 0.0 | 0 | 0 | NO |

TABLE 10

| | DIN 4102 B2 | | | | |
|---|---|---|---|---|---|
| Sample | Maturing time (days) | Flame height (cm) | Flaming time (s) | Dripping | Pater ignition |
| EXAMPLE 9 | 5 | 0.0 | 0 | 0 | NO |
| | | 0.0 | 0 | 0 | NO |
| | | 2.7 | 9 | 0 | NO |
| | | 0.0 | 0 | 0 | NO |
| | | 6.0 | 11 | 0 | NO |

TABLE 11

| | DIN 4102 B2 | | | | |
|---|---|---|---|---|---|
| Sample | Maturing time (days) | Flame height (cm) | Flaming time (s) | Dripping | Pater ignition |
| EXAMPLE 10 | 5 | 0.0 | 0 | 0 | NO |
| | | 0.0 | 0 | 0 | NO |
| | | 0.0 | 0 | 0 | NO |
| | | 0.0 | 0 | 0 | NO |
| | | 0.0 | 0 | 0 | NO |

TABLE 12

Examples summary for prepared EPS foams.

| | Examples | | | | | | | | | |
|---|---|---|---|---|---|---|---|---|---|---|
| | 1 | 2 | 3 | 4 | 5 | 6 | 7 | 8 | 9 | 10 |
| Synthos PS 585X | YES | YES | YES | YES | YES | YES | YES | YES | YES | YES |
| Geopolymer composite (wt. %) | 10 | 10 | — | — | 10 | 10 | 10 | 10 | 13 | 12.2 |
| /type/ | /1/ | /1/ | | | /1/ | /1/ | /1/ | /1/ | /2/ | /3/ |
| Phosphoric acid (wt. %) | — | — | — | — | — | — | — | — | — | 0.6* |
| Exolit AP 420 (wt. %) | — | — | — | — | — | — | — | — | 1.7* | 0.6* |
| Ammonium polyphosphate powder /Exolit AP 222 (D50 17 μm)/ (wt. %) | — | — | 2 | 5 | 2 | 5 | — | — | — | — |
| Ammonium polyphosphate powder /Exolit AP 223 (D50 8 μm)/ (wt. %) | — | — | — | — | — | — | 2 | — | — | 0.5 |
| DOPO /Struktol Polyphlox 3710/ (wt. %) | — | — | — | — | — | — | — | 2 | — | — |
| Bicumyl (wt. %) | — | 0.15 | 0.15 | 0.15 | 0.15 | 0.15 | 0.15 | 0.15 | 0.15 | 0.15 |
| Polywax 2000 (wt. %) | 0.15 | 0.15 | 0.15 | 0.15 | 0.15 | 0.15 | 0.15 | 0.15 | 0.15 | 0.15 |
| Pentane/Isopentane 80/20 (wt. %) | 5.5 | 5.5 | 5.5 | 5.5 | 5.5 | 5.5 | 5.5 | 5.5 | 5.5 | 5.5 |

*means that phosphoric acid and/or ammonium polyphosphate was incorporated into geopolymer composite structure via wet modification method.

TABLE 13

Expanded foam composite parameters at ca. 15.0 kg/m³.

| | Examples | | | | | | | | | |
|---|---|---|---|---|---|---|---|---|---|---|
| | 1 | 2 | 3 | 4 | 5 | 6 | 7 | 8 | 9 | 10 |
| Dimensional stability at temp. 70° C. and humidity 50 ± 5% (% of shape change) | 0.10 | 0.10 | 0.10 | 0.10 | 0.10 | 0.10 | 0.10 | 0.10 | 0.10 | 0.10 |
| Thermal conductivity (mW/m · K) | 30.5 | 30.5 | 37.0 | 37.2 | 30.4 | 30.5 | 30.5 | 30.5 | 30.4 | 30.4 |
| Flammability (EN standard) | − | − | − | − | + | + | + | + | + | + |
| Flammability (DIN B2 standard) | − | − | − | − | − | + | − | + | + | + |

TABLE 13-continued

Expanded foam composite parameters at ca. 15.0 kg/m³.

| | Examples | | | | | | | | | |
|---|---|---|---|---|---|---|---|---|---|---|
| | 1 | 2 | 3 | 4 | 5 | 6 | 7 | 8 | 9 | 10 |
| Compressive strength at 10% def. (kPa) | 70 | 68 | 80 | 85 | 69 | 63 | 66 | 67 | 71 | 65 |
| Bending strength (kPa) | 140 | 137 | 190 | 192 | 136 | 132 | 133 | 133 | 142 | 135 |

Passed (+);
Not passed (−)

The invention claimed is:

1. A process for the production of expandable polymer granulate by an extrusion or a suspension process, the process comprising the addition of
   i) one or more geopolymer additives, wherein the geopolymer additive is
      a) a geopolymer;
      b) a combination of a geopolymer with an athermanous additive; or
      c) a geopolymer composite derived from geopolymer and comprising athermanous additive,
   and
   ii) one or more non-brominated flame retardants selected from
      a) phosphorus-based flame retardants,
      b) nitrogen-based flame retardants, and
      c) phosphorus/nitrogen-based flame retardants;
   wherein the polymer is a vinyl aromatic polymer, and wherein the geopolymer or geopolymer composite has a particle size in the range of 0.1 μm to 200 μm.

2. Composition comprising one or more vinyl aromatic polymers, the composition further comprising
   i) one or more geopolymer additives, wherein the geopolymer additive is
      a) a geopolymer;
      b) a combination of a geopolymer with an athermanous additive; or
      c) a geopolymer composite derived from geopolymer and comprising athermanous additive,
   and
   ii) one or more non-brominated flame retardants selected from
      a) phosphorus-based flame retardants,
      b) nitrogen-based flame retardants, and
      c) phosphorus/nitrogen-based flame retardants,
   wherein the composition is in the form of an expandable granulate,
   wherein the polymer is a vinyl aromatic polymer, the granulate further comprising one or more propellants, and
   wherein the geopolymer or geopolymer composite has a particle size in the range of 0.1 μm to 200 μm.

3. Composition comprising one or more polymers, the composition further comprising
   i) one or more geopolymer additives, wherein the geopolymer additive is
      d) a geopolymer;
      e) a combination of a geopolymer with an athermanous additive; or
      f) a geopolymer composite derived from geopolymer and comprising athermanous additive,
   and
   ii) one or more non-brominated flame retardants selected from
      d) phosphorus-based flame retardants,
      e) nitrogen-based flame retardants, and
      f) phosphorus/nitrogen-based flame retardants,
   wherein the composition is in the form of expanded vinyl polymer foam, and the vinyl polymer is vinyl aromatic polymer,
   the foam having
      a density of from 8 to 30 kg/m³, and
      a thermal conductivity (as measured according to ISO 8301) of from 25 to 35 mW/K·m,
   wherein the geopolymer or geopolymer composite has a particle size in the range of 0.1 μm to 200 μm.

4. The expanded vinyl polymer foam of claim 3, obtainable by expansion of a granulate, comprising a composition comprising one or more polymers, the composition further comprising
   i) one or more geopolymer additives, wherein the geopolymer additive is
      a) a geopolymer;
      b) a combination of a geopolymer with an athermanous additive; or
      c) a geopolymer composite derived from geopolymer and comprising athermanous additive,
   and
   ii) one or more non-brominated flame retardants selected from
      a) phosphorus-based flame retardants,
      b) nitrogen-based flame retardants, and
      c) phosphorus/nitrogen-based flame retardants,
   wherein the composition is in the form of an expandable granulate, wherein the polymer is a vinyl aromatic polymer, the granulate further comprising one or more propellants.

5. The composition of claim 2, which composition comprises
   vinyl aromatic polymer prepared from styrene monomer with optional incorporation of one or more vinyl comonomers and
   c) 0.01-50 wt. % (by polymer weight, including solid and, if any, liquid additives, but exclusive of propellant) of geopolymer composite in powder form, with a particle size in a range of from 0.1 μm to 200 μm and a BET surface in a range of from 0.01 to 10,000 m²/g.

6. The composition of claim 2, wherein the composition does not comprise polymeric brominated flame retardant.

7. The composition of claim 2, wherein the composition does not comprise brominated flame retardant.

8. The composition of claim 2, wherein the composition does not comprise halogenated flame retardant.

9. The composition of claim 2, wherein the athermanous additive is one or more selected from the group consisting of (1) carbon-based athermanous additives,
(2) metal athermanous additives,
(3) metal oxide athermanous additives, and
(4) metal sulfide athermanous additives.

10. The composition of claim 9, wherein the carbon-based athermanous additive is selected from carbon black, coke, graphitized carbon black, graphite, graphite oxides, anthracite, graphene, and graphene oxide.

11. The composition of claim 9, wherein the metal athermanous additive is selected from copper, bismuth, nickel, iron, tungsten, silver, cadmium, cobalt, tin, and zinc.

12. The composition of claim 9, wherein the metal oxide athermanous additive is selected from oxides of the metals of groups IIIB, IV-VIIIA, and I-VB of the periodic table.

13. The composition of claim 2, wherein the phosphorus-based flame retardant a) is selected from red phosphorus, organic and inorganic phosphates, phosphon-ates, phosphinates, and phosphoramidates.

14. The composition of claim 13, wherein
the organic phosphate is selected from triphenyl phosphate (TPP), resorcinol bis(diphenyl-phosphate) (RDP), bisphenol A bis(diphenylphosphate) (BADP), tri-cresyl phosphate (TCP), and resorcinol bis(2,6-dixylenyl--phosphate) (RDX),
the phosphinate is selected from aluminium phosphinates, calcium phosphinates and zinc phosphinates, and
the phosphoramidate is 9,10-Dihydro-9-oxa-10-phospha-phenanthrene-10-oxide (DOPO).

15. The composition of claim 2, wherein the nitrogen-based flame retardant b) is selected from hindered amine stabilizer, ammonium octamolybdate, melamine octamolybdate, benzoguanamine, tris(hydroxy-ethyl) isocyanurate, allantois, glycoluril, melamine, melamine cyanurate, dicyandiamide, guanidine, carbo-diimides, condensation products of melamine, and derivatives thereof.

16. The composition of claim 2, wherein the phosphorus/nitrogen-based flame retardant c) is selected from melamine phosphate, melamine pyrophosphate, melamine polyphosphate ammonium polyphosphate, and ethylene diamine phosphate.

17. The composition of claim 2, wherein the non-brominated flame retardant is a non-halogenated flame retardant.

18. The composition of claim 2, wherein the geopolymer or geopolymer composite has been modified with one or more water-soluble compounds.

19. The composition of claim 18, wherein the water-soluble compound is selected from phosphorus compounds, nitrogen compounds, copper compounds, silver compounds, zinc compounds, tin compounds, and magnesium compounds.

20. The composition of claim 19, wherein the modification is with a phosphorus compound.

21. The composition of claim 20, wherein the modification is with a phosphorus compound selected from phosphoric acid and ammonium polyphosphate.

22. The composition of claim 2, wherein the geopolymer or geopolymer composite has an average particle size (D50) in the range of 0.1 to 10 μm.

* * * * *